Sept. 15, 1959 J. F. ROSS ET AL 2,904,516
HALOPHOSPHATE PHOSPHOR PREPARATION
Filed July 6, 1953 3 Sheets-Sheet 1

Inventors:
John F. Ross,
Harold W. Sloyer,
by Vernet C. Kauffman
Their Attorney.

Inventors:
John F. Ross,
Harold W. Sloyer,
by Vernet C. Kauffman
Their Attorney.

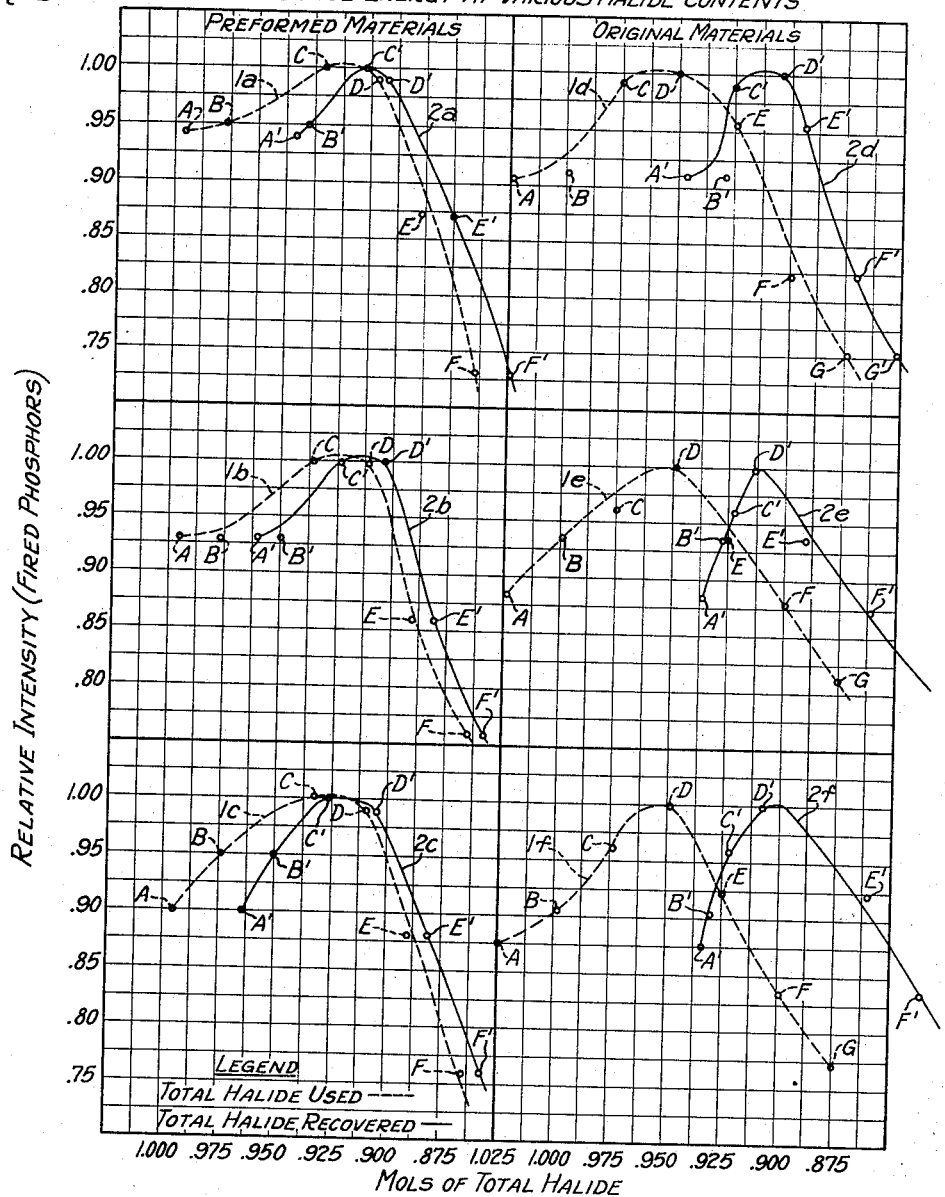

2,904,516

HALOPHOSPHATE PHOSPHOR PREPARATION

John F. Ross, Shaker Heights, and Harold W. Sloyer, Willoughby, Ohio, assignors to General Electric Company, a corporation of New York Application July 6, 1953, Serial No. 366,094

3 Claims. (Cl. 252—301.4)

This invention relates to luminescent materials or phosphors, and more particularly to phosphors of the halophosphate type.

In general, halophosphates are compounds more or less analogous to the natural mineral apatite, and the phosphor may be represented by the formula $$3M_3(PO_4)_2 \cdot (M'L + RL)$$

where L represents a halogen or a mixture of halogens, R represents an activator metal or metals, and M and M' represent either the same or different bivalent metals or mixtures of such metals. Suitable activator metals include antimony, manganese, bismuth, tin, lead, etc. The metals M and M' include the alkaline earth metals and zinc, cadmium, etc.

It is an object of our invention to provide a novel process of manufacturing halophosphate phosphors which provides a much better and more uniform control of the phosphor reaction, as well as a novel composition of the phosphors. Further advantages of our process are the virtual elimination of weight loss in the batch and gas evolution during the firing. Our improved process also results in a considerable reduction in losses of activator metals and halogen.

The halophosphate phosphors most widely used, and therefore more particularly referred to herein, are those wherein the base metal is calcium and the halogen consists of both chlorine and fluorine or fluorine alone, and the activator consists of both antimony and manganese, or antimony alone. Such halo phosphate phosphors have the composition of the mineral apatite, $3Ca_3(PO_4)_2 \cdot Ca(F,Cl)_2$. Chemically, the mineral may therefore be regarded as the combination of three moles of calcium orthophosphate with one mole of calcium halide, either fluoride or chloride or a mixture of the two.

Although these proportions appear to be preserved in the composition of the mineral, yet it is emphasized that the identity of the two compounds is completely lost once they have been combined to form the apatite crystal. The essential characteristic of apatite lies in its structure, i.e., the crystalline pattern into which the various elements are fitted. The key positions in this pattern are filled by halide atoms, which occupy the corners of the unit cell. Each halide atom is surrounded by three calcium atoms. Other poistions in the cell are occupied by phosphorus atoms. Each phosphorus atom is surrounded by four oxygen atoms at the corners of a tetrahedron enclosing the phosphorus atom. The pattern is such that a calcium atom adjoins each oxygen atom as a link, so to speak, between neighboring $PO_4$ tetrahedra.

The pattern of the crystal as a whole is made up of a succession of such unit cells. A cross section through the crystal would show a 2-dimensional repetition of the identical unit cell. This structure is invariably the same in all forms of apatite, whether prepared by nature or by synthesis. Other metallic elements may be substituted for some or all of the calcium atoms, but the same structure persists with the definite pattern described above.

In the phosphor, certain of such substitutions have been made. Activators are essential for the appearance of luminescence. In the most widely used composition, antimony is a highly effective activator for producing blue luminescence. When manganese is present as well as antimony, luminescence occurs in the "red" (as a band peaking at 5900–6000 A.) as well as in the blue. By varying the proportion of manganese to antimony, the relative intensities of their blue and red luminescence bands are so varied that shades of fluorescence color are obtained ranging from blue to yellow, orange and red. In fact, the balance between the two activators and the fluorine and chlorine content may be so set that shades of white light may be closely approximated.

It must be kept in mind that the phosphor still retains the definite composition and structure of apatite despite the substitutions that have been made. The activating elements fit into the apatite pattern by direct substitution for some of the calcium atoms.

In the method generally employed heretofore for producing the phosphor, compounds of all the ingredients of the halophosphate were mixed and fired at elevated temperatures of about 1100–1150° C. to effect a reaction between them. These compounds might be, for instance, calcium acid phosphate, calcium carbonate, calcium fluoride and chloride, manganese carbonate and antimony oxide. If their proportions had been properly chosen, the reaction would lead ultimately to the formation of the halophosphate phosphor which would crystallize out in particles having the characteristic composition and structure of apatite. In the course of the reaction, however, secondary and undesirable reactions occur because of the complexity of the ingredient compounds present. They are undesirable because they lead to losses of some of the vital elements present, most particularly chlorine and antimony. The chloride losses are of the order of 40% of the quantity used. The actual loss of antimony is about 25%, and the useful antimony remaining is about 50% of the quantity used. Moreover, the phosphor mixture loses about 20% of its weight on firing in the form of water and carbon dioxide. Some of the elements which are thus lost appear in volatile compounds which have a corroding effect upon the materials used in the furnace, as well as an offensive effect upon the atmosphere. The other losses lead to the formation of inert compounds, such as a calcium antimonate, which remain in the phosphor. Both types of losses lead to uncertainties in the activator concentration and in the chlorine content of the phosphor and thereby alter the color of the fluorescence.

To allow for such losses, it has been necessary to modify the proportion of the compounds in the reactive mixture from the theoretical proportion required for the formation of apatite. These changes were arrived at empirically. While satisfactory results have been produced, there is the disadvantage of the necessity for changing the compositions from time to time to allow for unexpected variations in the firing conditions.

We have found that these disadvantages may be avoided by our new process. One basis for it lies in our discovery that the reaction leading to the formation of apatite takes place at a very much lower temperature than had heretofore been realized. In fact, we have determined that the apatite compositions are actually formed more readily, and at lower temperatures than tri-calcium phosphate. We have determined the composition of the products formed at various temperatures and found that the apatite reaction is virtually complete at as low a temperature as about 800° C.

We have also found that the product must be fired to much higher temperatures before minor but critical adjustments within the crystal can be made and which are essential to the maximum output of fluorescence. The most important of these is the assimilation of the activator, for instance antimony. The progress of this assimilation can be measured, for it is accompanied by the development of increased luminescence when the phosphor is exposed to 2537 A. radiation.

Based upon these two discoveries, we have evolved a procedure which avoids the difficulties and disadvantages involved in firing a mixture of all the ingredient compounds simultaneously. Accordingly, we prepare, at temperatures of about 800–900° C., the individual compounds of apatite composition which can then be mixed in the proportions requisite for a phosphor and fired at temperatures in the approximate range of 1100–1300° C.

By way of example, we have formed at about 800–900° C. four simple compounds of apatite composition, each of them comprising three moles of calcium orthophosphate to not more than one mole of a halide. For the antimony-manganese activated calcium helophosphate, the materials are: calcium chlor apatite, $3Ca_3(PO_4)_2 \cdot CaCl_2$; calcium fluor apatite, $3Ca_3(PO_4)_2 \cdot CaF_2$; manganese fluor apatite, $3Ca_3(PO_4)_2 \cdot MnF_2$; and antimony fluor apatite, $3Ca_3(PO_4)_2 \cdot 2/3SbF_3$. These individual apatites are prepared at temperatures of about 800–900° C. without the annoying side reactions referred to above because the ingredient compounds used for each product are so few that their reaction leads directly to the product desired.

With such products available, they may be mixed in the proportions needed for whatever phosphor may be desired. The mixture is then refired at about 1160° C. to secure their mutual solution into a mixed apatite. This final product has the structure of apatite. Its composition of course is complex because certain of the calcium atoms have been replaced by manganese and antimony atoms which are thereby able to fulfill their function as activators of luminescence.

Further features and advantages of our invention will appear from the following more detailed description and from the drawings wherein:

Fig. 5 is a group of curves illustrating relative brightness of phosphors containing various molar concentrations of total halide consisting of both chloride and fluoride.

Figure 1:
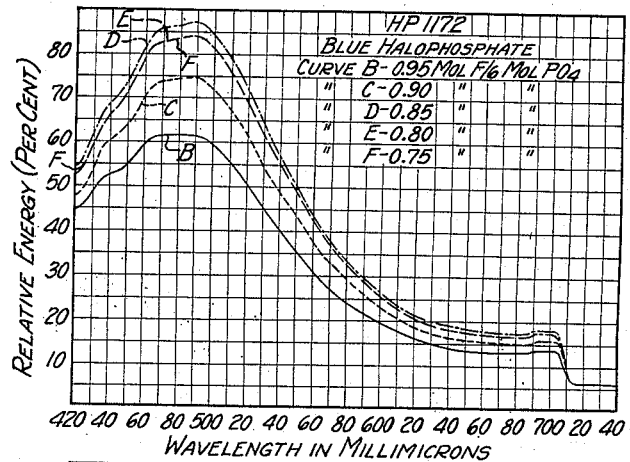
Figs. 1–3 represent spectroradiometer traces of a number of phosphors and illustrating the effect on over-all spectral emission of variations of halide content.

The various performed ingredient apatite compositions may, by way of example, be prepared as follows, the mixtures of specified ingredients being fired at the indicated temperatures for a time (varying from a few minutes to an hour or so and depending upon batch size) sufficient to complete the reaction as evidenced by the removal of volatile compounds such as water and carbon dioxide.

Calcium chlor apatite—$3Ca_3(PO_4)_2 \cdot CaCl_2$:

| | Moles |
|---|---|
| $CaHPO_4$ | 6 |
| $CaCO_3$ | 4 |
| $NH_4Cl$ | 2 |

Blend and fire at about 800–850° C.

Calcium fluor apatite—$3Ca_3(PO_4)_2 \cdot CaF_2$:

| | Moles |
|---|---|
| $CaHPO_4$ | 6 |
| $CaCO_3$ | 3 |
| $CaF_2$ | 1 |

Blend and fire at 900–950° C.

Calcium chlor fluor apatite (20% Cl, 80% F):

$3Ca_3(PO_4)_2 \cdot \begin{cases} 0.2\ CaCl_2 \\ 0.8\ CaF_2 \end{cases}$

| | Moles |
|---|---|
| $CaHPO_4$ | 6 |
| $CaCO_3$ | 3.2 |
| $CaF_2$ | 0.80 |
| $NH_4Cl$ | 0.40 |

Blend and fire at 800–900° C.

Manganese chlor apatite—$3Ca_3(PO_4)_2 \cdot MnCl_2$:

| | Moles |
|---|---|
| $Ca_3(PO_4)_2$ | 3 |
| $MnCO_3$ | 1 |
| $NH_4Cl$ | 2 |

Blend, heat first at about 325° C. to form $MnCl_2$, then fire at 900° C.

Manganese fluor apatite—$3Ca_3(PO_4)_2 \cdot MnF_2$:

| | Moles |
|---|---|
| $Ca_3(PO_4)_2$ | 3 |
| $MnCO_3$ | 1 |
| $NH_4HF_2$ | 1 |

Blend, heat first at about 225° C. to form $MnF_2$, then fire at 900° C.

Antimony chlor apatite—$3Ca_3(PO_4)_2 \cdot 2/3 SbCl_3$:

| | Moles |
|---|---|
| $Ca_3(PO_4)_2$ | 3 |
| $Sb_2O_3$ | 0.33 |
| $NH_4Cl$ | 2.0 |

Blend, heat first at a temperature not over 225° C. to form $SbCl_3$, then fire at 900° C.

Antimony fluor apatite—$3Ca_3(PO_4)_2 \cdot 2/3 SbF_3$:

| | Moles |
|---|---|
| $Ca_3(PO_4)_2$ | 3 |
| $Sb_2O_3$ | 0.33 |
| $NH_4HF_2$ | 1.0 |

Blend, heat first at about 225° C. to form $SbF_3$, then fire at 1100° C.

Alternate procedures may be employed as follows:

Manganese fluor apatite:

| | Moles |
|---|---|
| $Ca_3(PO_4)_2$—$Ca_2P_2O_7$ mix (8 mole Ca:6 mole $PO_4$) | 3 |
| $MnCO_3$ | 1 |
| $CaF_2$ | 1 |

Blend and fire at 900° C.

Antimony chlor apatite:

| | Moles |
|---|---|
| $Ca_3(PO_4)_2$—$Ca_2P_2O_7$ mix (8 moles Ca:6 moles $PO_4$) | 3 |
| $Sb_2O_3$ | 0.33 |
| $CaCl_2$ | 1.0 |

Blend and fire at 900° C.

Antimony fluor apatite:

| | Moles |
|---|---|
| $Ca_3(PO_4)_2$—$Ca_2P_2O_7$ mix (8 moles Ca:6 moles $PO_4$) | 3 |
| $Sb_2O_3$ | 0.33 |
| $CaF_2$ | 1.0 |

Blend and fire at 1100° C.

A typical example (HP 1090 C) of the use of the preformed apatites in preparing a phosphor is illustrated by the following formulation:

| | Moles | Parts by Wt. |
|---|---|---|
| $3Ca_3(PO_4)_2 \cdot CaCl_2$ | 0.2000 | 208 |
| $3Ca_3(PO_4)_2 \cdot CaF_2$ | 0.4572 | 461 |
| $3Ca_3(PO_4)_2 \cdot MnF_2$ | 0.1574 | 161 |
| $3Ca_3(PO_4)_2 \cdot 0.66\ SbF_3$ | 0.1854 | 194 |

The following are analyses of typical phosphors, in percent by weight, prepared by blending the various preformed apatites and firing at 1160° C.

|  | HP 1090 C | | HP 1090 E | |
|---|---|---|---|---|
|  | Used | Found | Used | Found |
| Calcium (Ca) | 37.62 | 37.98 | 37.39 | 37.80 |
| Phosphate (PO$_4$) | 55.26 | 55.9 | 54.86 | 55.7 |
| Chloride (Cl) | 1.35 | 1.05 | 2.69 | 2.25 |
| Fluoride (F) | 2.86 | 3.02 | 2.09 | 2.24 |
| Manganese (Mn) | 0.83 | 0.76 | 0.82 | 0.76 |
| Antimony (Sb) | 0.83 sol. / 1.04 total | 0.90 sol. | 0.83 sol. / 1.03 total | 0.79 sol. |

|  | HP 1091 C | | HP 1091 E | |
|---|---|---|---|---|
|  | Used | Found | Used | Found |
| Calcium (Ca) | 37.25 | 37.51 | 36.83 | 37.04 |
| Phosphate (PO$_4$) | 55.17 | 55.7 | 55.08 | 55.7 |
| Chloride (Cl) | 1.36 | 1.07 | 1.35 | 1.07 |
| Fluoride (F) | 2.85 | 2.97 | 2.83 | 3.03 |
| Manganese (Mn) | 1.29 | 1.26 | 1.83 | 1.79 |
| Antimony (Sb) | 0.83 sol. / 1.03 total | 0.60 sol. | 0.83 sol. / 1.03 total | 0.61 sol. |

In these tables, the antimony reported as "sol." represents the trivalent antimony which is soluble in hydrochloric acid.

In the above examples, the phosphors were prepared with three moles of calcium orthophosphate to one mole of halide. However, in accordance with a further aspect of our invention, we have found that still further improved results are obtained by employing an amount of halide less than one mole per six moles of PO$_4$.

The major variation in the composition of the phosphors from the theoretical apatite formula lies in the chloride content. A comprehensive study of many phosphors indicated that there was a level loss in chloride, and not a loss in proportion to the percentage used. This led to the discovery that the chloride loss was apparently making an automatic adjustment in the total halide in the phosphor, although substantially all the fluoride is retained. The sum of the molar proportions of the chloride and fluoride in these examples totals 0.90 to 0.95 mole rather than one mole. This indicates that the composition of the phosphor, or the apatite structure, may be $3Ca_3(PO_4)_2 \cdot 0.90-0.95 (CaCl_2+CaF_2)$ as further indicated by the results in the following table:

*Molar quantities of halide (Cl+F) found in phosphors*

| Variation | Cl to F | 1086 [1] | 1087 | 1088 | 1089 | 1090 | 1091 | 1092 | 1093 |
|---|---|---|---|---|---|---|---|---|---|
|  |  | Molar Concentration of Mn | | | | | | | |
|  |  | 0 | 0 | 0.0369 | 0.0738 | 0.1574 | 0.2460 | 0.3500 | 0.4225 |
| A | 0:100 | [2] (0.90) | (1.00) | (1.00) | (1.00) | (1.00) | (1.00) | (1.00) | (1.00) |
| B | 10:90 | 0.88 | 0.96 | 0.96 | 0.96 | 0.96 | 0.96 | 0.96 | 0.96 |
| C | 20:80 | 0.87 | 0.95 | 0.95 | 0.95 | 0.95 | 0.95 | 0.95 | 0.95 |
| D | 30:70 | 0.83 | 0.93 | 0.92 | 0.92 | 0.91 | 0.93 | 0.93 | 0.93 |
| E | 40:60 | 0.85 | 0.91 | 0.94 | 0.94 | 0.92 | 0.93 | 0.95 | 0.92 |
| F | 50:50 |  |  |  |  | 0.92 |  |  |  |
| G | 60:40 |  |  |  |  | 0.91 |  |  |  |
| H | 70:30 |  |  |  |  | 0.90 |  |  |  |
| I | 80:20 |  |  |  |  | 0.90 |  |  |  |

[1] Series 1086 contained only 0.90 total moles of halide—all other series contained 1.0 mole.
[2] Values in parentheses represent quantities used.

We have also determined that the all-fluoride phosphors are definitely improved when the total fluorine is reduced from 1 to about 0.9 mole per 6 moles PO$_4$. Having determined the existence of the critical relationship by virtue of the extremely close control made possible by the improved "preformed" process, we have further determined that this effect is obtained even when the all-fluoride halophosphate is prepared by firing the original ingredients, as indicated by the following table of 16 phosphors prepared by using the ingredients, in proportions by weight, as indicated, and firing the mixture at a temperature in the range of about 1100–1300° C., preferably about 1160° C.

HP 1172

|  | A | B | C | D | E | F |
|---|---|---|---|---|---|---|
| CaHPO$_4$ | 136 | 136 | 136 | 136 | 136 | 136 |
| CaCO$_3$ | 47.0 | 47.0 | 47.0 | 47.0 | 47.0 | 47.0 |
| CaF$_2$ | 13.0 | 12.3 | 11.7 | 11.0 | 10.3 | 9.7 |
| Sb$_2$O$_3$ | 3.0 | 3.0 | 3.0 | 3.0 | 3.0 | 3.0 |

HP 1173

|  | A | B | C | D | E | F |
|---|---|---|---|---|---|---|
| CaHPO$_4$ | 136 | 136 | 136 | 136 | 136 |  |
| CaCO$_3$ | 44.3 | 44.3 | 44.3 | 44.3 | 44.3 |  |
| CaF$_2$ | 13.0 | 12.3 | 11.7 | 11.0 | 10.3 |  |
| MnCO$_3$ | 3.1 | 3.1 | 3.1 | 3.1 | 3.1 |  |
| Sb$_2$O$_3$ | 3.0 | 3.0 | 3.0 | 3.0 | 3.0 |  |

HP 1174

|  | A | B | C | D | E | F |
|---|---|---|---|---|---|---|
| CaHPO$_4$ | 136 | 136 | 136 | 136 | 136 |  |
| CaCO$_3$ | 41.0 | 41.0 | 41.0 | 41.0 | 41.0 |  |
| CaF$_2$ | 13.0 | 12.3 | 11.7 | 11.0 | 10.3 |  |
| MnCO$_3$ | 7.1 | 7.1 | 7.1 | 7.1 | 7.1 |  |
| Sb$_2$O$_3$ | 3.0 | 3.0 | 3.0 | 3.0 | 3.0 |  |

Figure 2:
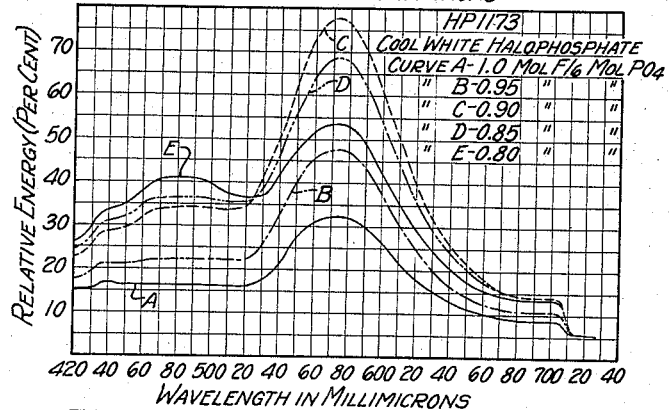
Figure 3:
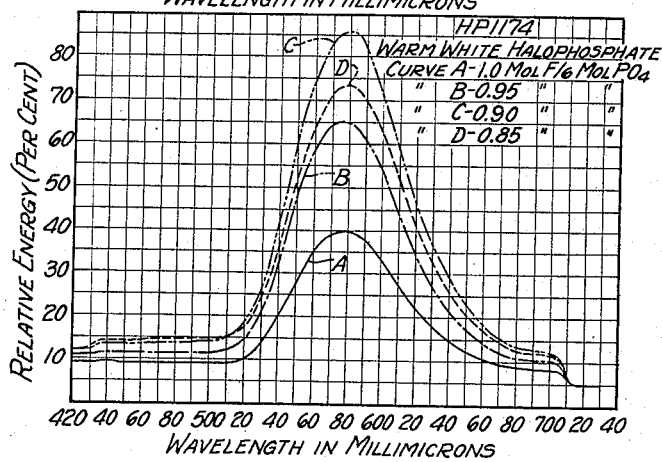

The various above modifications contain fluoride in the following molar proportions:

All "A" samples 1.0 mole F per 6 mole PO$_4$
All "B" samples 0.95 mole F per 6 mole PO$_4$
All "C" samples 0.90 mole F per 6 mole PO$_4$
All "D" samples 0.85 mole F per 6 mole PO$_4$
All "E" samples 0.80 mole F per 6 mole PO$_4$
All "F" samples 0.75 mole F per 6 mole PO$_4$ Spectroradiometer traces, as illustrated in Figs. 1–3, show the spectral emissions of the various phosphors when radiated with 2537 A. It will be noted that the optimum brightness is obtained with the blue halophosphate (HP 1172), Fig. 1, when the fluoride content falls within the range of 0.7 (or even less) to 0.90 mole per 6 moles PO$_4$. In the cases of the relatively low manganese phosphor (Fig. 2), and the relatively high manganese phosphor (HP 1174) (Fig. 3), the optimum fluoride content is between 0.85 and 0.95 mole per 6 moles of PO$_4$.

Figure 4:
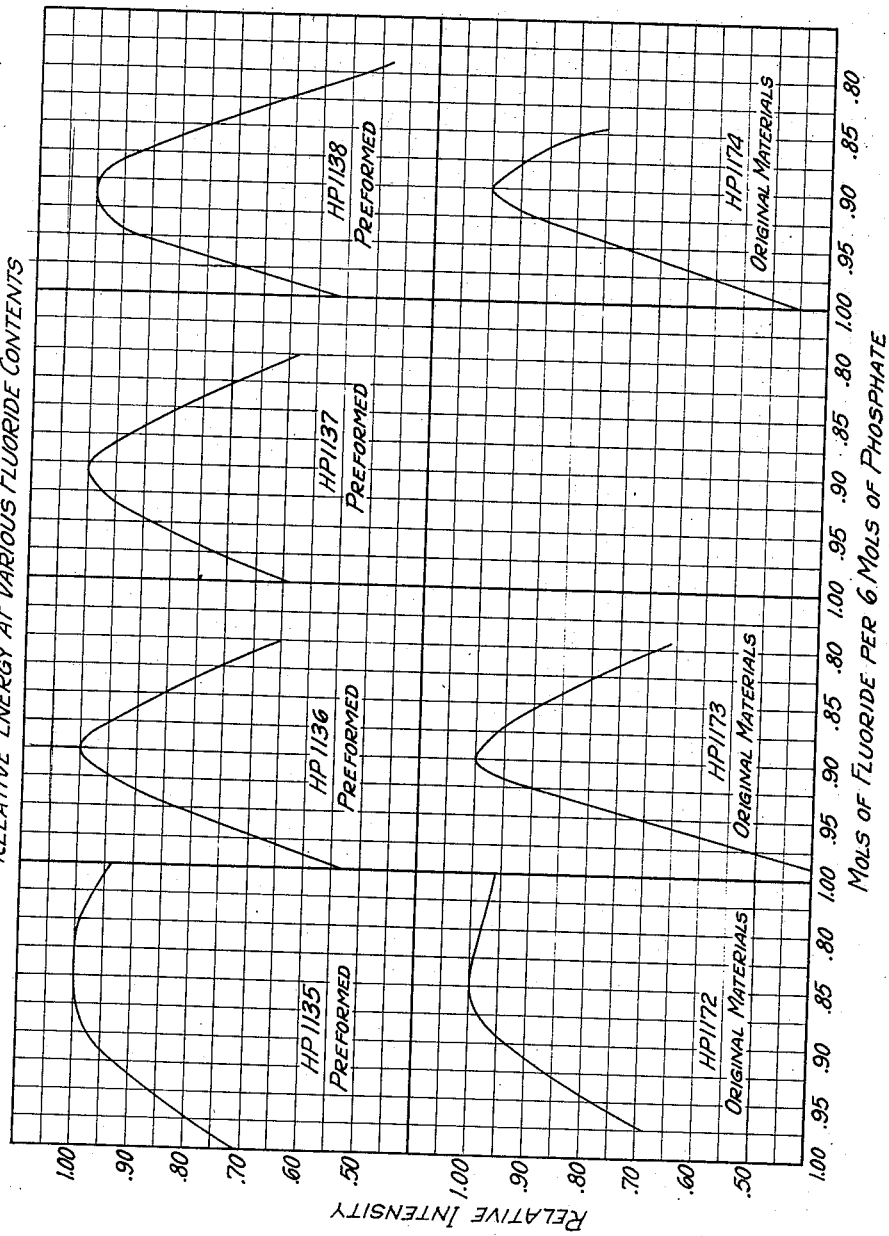
Fig. 4 is a group of curves illustrating the relative energy at various fluoride contents of several phosphors of all-fluoride type.

Fig. 4 of the drawing illustrates the relative energy at various fluoride contents of seven phosphors of the all-fluoride type. The three curves in the lower half of Fig. 4 and carrying the legends HP 1172, HP 1173 and HP 1174 are based upon the respective series of phosphor composition listed hereinbefore and identified by the same legends.

The four curves in the upper half of Fig. 4 and carrying the legends HP 1135, HP 1136, HP 1137 and HP 1138 are based upon respective series of phosphors prepared by firing the following mixtures of preformed ingredients.

HP 1135 (No Mn)

| | A | B | C | D | E | F |
|---|---|---|---|---|---|---|
| $3Ca_3(PO_4)_2 \cdot (1.0CaF_2)$ | 985 | 786 | 583 | 382 | 181 | |
| $3Ca_3(PO_4)_2 \cdot (.7CaF_2)$ | | 195 | 394 | 590 | 786 | 947 |
| $3Ca_3(PO_4)_2 \cdot (.3CaF_2)$ | | | | | | 16 |
| $3Ca_3(PO_4)_2 \cdot (.67SbF_3)$ | 233 | 233 | 233 | 233 | 233 | 233 |

HP 1136 (Low Mn)

| | A | B | C | D | E | F |
|---|---|---|---|---|---|---|
| $3Ca_3(PO_4)_2 \cdot (1.0CaF_2)$ | 795 | 594 | 392 | 191 | | |
| $3Ca_3(PO_4)_2 \cdot (.7CaF_2)$ | | 197 | 394 | 590 | 769 | |
| $3Ca_3(PO_4)_2 \cdot (.3CaF_2)$ | | | | | 8 | |
| $3Ca_3(PO_4)_2 \cdot (1.0MnF_2)$ | 193 | 193 | 193 | 193 | 193 | |
| $3Ca_3(PO_4)_2 \cdot (.67SbF_3)$ | 233 | 233 | 233 | 233 | 233 | |

HP 1137 (Medium Mn)

| | A | B | C | D | E | F |
|---|---|---|---|---|---|---|
| $3Ca_3(PO_4)_2 \cdot (1.0CaF_2)$ | 688 | 486 | 285 | 83 | | |
| $3Ca_3(PO_4)_2 \cdot (.7CaF_2)$ | | 197 | 394 | 591 | 585 | |
| $3Ca_3(PO_4)_2 \cdot (.3CaF_2)$ | | | | | 84 | |
| $3Ca_3(PO_4)_2 \cdot (1.0MnF_2)$ | 302 | 302 | 302 | 302 | 302 | |
| $3Ca_3(PO_4)_2 \cdot (.67SbF_3)$ | 233 | 233 | 233 | 233 | 233 | |

HP 1138 (High Mn)

| | A | B | C | D | E | F |
|---|---|---|---|---|---|---|
| $3Ca_3(PO_4)_2 \cdot (1.0CaF_2)$ | 562 | 360 | 159 | | | |
| $3Ca_3(PO_4)_2 \cdot (.7CaF_2)$ | | 198 | 394 | 517 | 370 | |
| $3Ca_3(PO_4)_2 \cdot (.3CaF_2)$ | | | | 31 | 173 | |
| $3Ca_3(PO_4)_2 \cdot (1.0MnF_2)$ | 429 | 429 | 429 | 429 | 429 | |
| $3Ca_3(PO_4)_2 \cdot (.67SbF_3)$ | 233 | 233 | 233 | 233 | 233 | |

We have also determined that in the case of chlor-fluor halophosphate phosphors the optimum brightness results when about 0.9 mole of $(Cl_2+F_2)$ is used with 6 moles of $PO_4$ and the phosphors are made from the preformed apatite compositions in accordance with our invention whereby accurate control is achieved.

Fig. 5 of the drawing shows the relative brightness at various molar concentrations of total halide. The broken line curves 1a—1f indicate the quantity of halide used and the solid line curves 2a—2f the quantity of halide in the finished fired phosphor as determined by chemical analysis. The horizontal spread between any two points labeled with a given letter and the same letter with an added prime (e.g., A and A') is a measure of the halide loss on firing. It will be noted that the fixation of the halide is under much better control when the preformed apatites are used. It will also be appreciated that the curves 1a—1f do not represent actual readings of relative energy but only quantities of halide initially used, inasmuch as the unfired materials are not, of course, fluorescent.

The phosphors from which the curves in Fig. 5 were compiled were prepared by firing materials of the compositions and proportions (in parts by weight) listed in the following tables.

TABLE I

The preformed materials for the phosphor compositions represented in curve 1a were as follows:

| | A | B | C | D | E | F |
|---|---|---|---|---|---|---|
| $3Ca_3(PO_4)_2 \cdot 1.0CaCl_2$ | 161 | 81 | | | | |
| $3Ca_3(PO_4)_2 \cdot 1.0CaF_2$ | 639 | 320 | | | | |
| $3Ca_3(PO_4)_2 \cdot 1.0MnCl_2$ | 39 | 40 | | | | |
| $3Ca_3(PO_4)_2 \cdot 1.0MnF_2$ | 155 | 77 | | | | |
| $3Ca_3(PO_4)_2 \cdot 0.67(SbF_3)$ | 233 | 233 | 233 | 233 | 233 | 233 |
| $3Ca_3(PO_4)_2 \cdot 0.95CaCl_2$ | | 80 | | | | |
| $3Ca_3(PO_4)_2 \cdot 0.95CaCl_2$ | | 319 | | | | |
| $3Ca_3(PO_4)_2 \cdot 0.95MnF_2$ | | 77 | | | | |
| $3Ca_3(PO_4)_2 \cdot (.187CaCl_2+.752CaF_2)$ | | | 798 | | | |
| $3Ca_3(PO_4)_2 \cdot (.187MnCl_2+.752MnF_2)$ | | | 194 | | | |
| $3Ca_3(PO_4)_2 \cdot (.182CaCl_2+.726CaF_2)$ | | | | 797 | | |
| $3Ca_3(PO_4)_2 \cdot (.182MnCl_2+.726MnF_2)$ | | | | 194 | | |
| $3Ca_3(PO_4)_2 \cdot (.177CaCl_2+.700CaF_2)$ | | | | | 796 | |
| $3Ca_3(PO_4)_2 \cdot (.177MnCl_2+.700MnF_2)$ | | | | | 193 | |
| $3Ca_3(PO_4)_2 \cdot (.172CaCl_2+.675CaF_2)$ | | | | | | 795 |
| $3Ca_3(PO_4)_2 \cdot (.172MnCl_2+.675MnF_2)$ | | | | | | 193 |

TABLE II

The preformed materials for the phosphor compositions represented in curve 1b were as follows:

| | A | B | C | D | E | F |
|---|---|---|---|---|---|---|
| $3Ca_3(PO_4)_2 \cdot 1.0CaCl_2$ | 140 | 70 | | | | |
| $3Ca_3(PO_4)_2 \cdot 1.0CaF_2$ | 554 | 277 | | | | |
| $3Ca_3(PO_4)_2 \cdot 1.0MnCl_2$ | 61 | 61 | | | | |
| $3Ca_3(PO_4)_2 \cdot 1.0MnF_2$ | 243 | 122 | | | | |
| $3Ca_3(PO_4)_2 \cdot 0.67(SbF_3)$ | 233 | 233 | 233 | 233 | 233 | 233 |
| $3Ca_3(PO_4)_2 \cdot 0.95CaCl_2$ | | 70 | | | | |
| $3Ca_3(PO_4)_2 \cdot 0.95CaCl_2$ | | 276 | | | | |
| $3Ca_3(PO_4)_2 \cdot 0.95MnF_2$ | | 121 | | | | |
| $3Ca_3(PO_4)_2 \cdot (.187CaCl_2+.752CaF_2)$ | | | 691 | | | |
| $3Ca_3(PO_4)_2 \cdot (.187MnCl_2+.752MnF_2)$ | | | 303 | | | |
| $3Ca_3(PO_4)_2 \cdot (.182CaCl_2+.726CaF_2)$ | | | | 690 | | |
| $3Ca_3(PO_4)_2 \cdot (.182MnCl_2+.726MnF_2)$ | | | | 303 | | |
| $3Ca_3(PO_4)_2 \cdot (.177CaCl_2+.700CaF_2)$ | | | | | 689 | |
| $3Ca_3(PO_4)_2 \cdot (.177MnCl_2+.700MnF_2)$ | | | | | 303 | |
| $3Ca_3(PO_4)_2 \cdot (.172CaCl_2+.675CaF_2)$ | | | | | | 688 |
| $3Ca_3(PO_4)_2 \cdot (.172MnCl_2+.675MnF_2)$ | | | | | | 303 |

TABLE III

The preformed materials for the phosphor compositions represented in curve 1c were as follows:

|  | A | B | C | D | E | F |
|---|---|---|---|---|---|---|
| $3Ca_3(PO_4)_2 \cdot 1.0CaCl_2$ | 113 | 56 | | | | |
| $3Ca_3(PO_4)_2 \cdot 1.0CaF_2$ | 450 | 337 | | | | |
| $3Ca_3(PO_4)_2 \cdot 1.0MnCl_2$ | 88 | 88 | | | | |
| $3Ca_3(PO_4)_2 \cdot 1.0MnF_2$ | 348 | 174 | | | | |
| $3Ca_3(PO_4)_2 \cdot 0.67(SbF_3)$ | 233 | 233 | 233 | 233 | 233 | 233 |
| $3Ca_3(PO_4)_2 \cdot 0.95CaCl_2$ | | 56 | | | | |
| $3Ca_3(PO_4)_2 \cdot 0.95CaCl_2$ | | 112 | | | | |
| $3Ca_3(PO_4)_2 \cdot 0.95MnF_2$ | | 173 | | | | |
| $3Ca_3(PO_4)_2 \cdot (.187CaCl_2+.752CaF_2)$ | | | 564 | | | |
| $3Ca_3(PO_4)_2 \cdot (.187MnCl_2+.752MnF_2)$ | | | 431 | | | |
| $3Ca_3(PO_4)_2 \cdot (.182CaCl_2+.726CaF_2)$ | | | | 563 | | |
| $3Ca_3(PO_4)_2 \cdot (.182MnCl_2+.726MnF_2)$ | | | | 431 | | |
| $3Ca(PO_4)_2 \cdot (.177CaCl_2+.700CaF_2)$ | | | | | 562 | |
| $3Ca_3(PO_4)_2 \cdot (.177MnCl_2+.700MnF_2)$ | | | | | 430 | |
| $3Ca_3(PO_4)_2 \cdot (.172CaCl_2+.675CaF_2)$ | | | | | | 562 |
| $3Ca_3(PO_4)_2 \cdot (.172MnCl_2+.675MnF_2)$ | | | | | | 430 |

The "original" ingredient materials for the phosphor compositions represented in curves 1d—1f, respectively, were as follows:

HP 1205 (Curve 1d)

|  | A | B | C | D | E | F | G |
|---|---|---|---|---|---|---|---|
| $CaHPO_4$ | 868 | 868 | 868 | 868 | 868 | 868 | 868 |
| $CaCO_3$ | 266 | 266 | 266 | 266 | 266 | 266 | 266 |
| $CaCl_2$ | 24.0 | 23.4 | 22.8 | 22.2 | 21.6 | 21.1 | 20.5 |
| $CaF_2$ | 67.2 | 65.5 | 63.9 | 62.2 | 60.6 | 59.0 | 57.3 |
| $MnCO_3$ | 19.2 | 19.2 | 19.2 | 19.2 | 19.2 | 19.2 | 19.2 |
| $Sb_2O_3$ | 18.0 | 18.0 | 18.0 | 18.0 | 18.0 | 18.0 | 18.0 |

HP1206 (Curve 1e)

|  | A | B | C | D | E | F | G |
|---|---|---|---|---|---|---|---|
| $CaHPO_4$ | 868 | 868 | 868 | 868 | 868 | 868 | 868 |
| $CaCO_3$ | 257 | 257 | 257 | 257 | 257 | 257 | 257 |
| $CaCl_2$ | 24.0 | 23.4 | 22.8 | 22.2 | 21.6 | 21.1 | 20.5 |
| $CaF_2$ | 67.2 | 65.5 | 63.9 | 62.2 | 60.6 | 59.0 | 57.3 |
| $MnCO_3$ | 30 | 30 | 30 | 30 | 30 | 30 | 30 |
| $Sb_2O_3$ | 18.0 | 18.0 | 18.0 | 18.0 | 18.0 | 18.0 | 18.0 |

HP 1207 (Curve 1f)

|  | A | B | C | D | E | F | G |
|---|---|---|---|---|---|---|---|
| $CaHPO_4$ | 868 | 868 | 868 | 868 | 868 | 868 | 868 |
| $CaCO_3$ | 246 | 246 | 246 | 246 | 246 | 246 | 246 |
| $CaCl_2$ | 24.0 | 23.4 | 22.8 | 22.2 | 21.6 | 21.1 | 20.5 |
| $CaF_2$ | 67.2 | 65.5 | 63.9 | 62.2 | 60.6 | 59.0 | 57.3 |
| $MnCO_3$ | 42.7 | 42.7 | 42.7 | 42.7 | 42.7 | 42.7 | 42.7 |
| $Sb_2O_3$ | 18.0 | 18.0 | 18.0 | 18.0 | 18.0 | 18.0 | 18.0 |

When the phosphor contains manganese, the fluorescent brightness decreases if the halide falls much below 0.9 mole (1.8 moles of halogen). This appears to be due to the oxidation of some of the manganese in view of the pink color which develops in the phosphor. This oxidation can be reduced by the use of a protective gas, such as chlorine, during firing and thereby the optimum molage range of 0.85 to 0.95 may be spread to lower halide contents, say 0.7 and even lower, as indicated by the blue type phosphor which does not contain manganese.

The desirability of employing about 0.9 mole of total halide per 6 moles of $PO_4$ is further evidenced by the preparation of a very comprehensive series of phosphors from preformed apatites containing 0.92 to 0.94 mole total halide. The phosphors (134 in number) were prepared by varying the manganese and also the chloride-to-fluoride weight proportions. The Cl:F ratios ranged from 0:92 to 40:52, and for each one of these the manganese was varied from about 0.3% Mn to 2.4% Mn by weight.

These materials were formed by firing at temperatures of about 1150° C. mixtures of the preformed ingredient apatite compositions prepared in the manner of the examples given hereinbefore except that they were each proportioned to provide the indicated amount of about 0.9 mole of halide instead of one full mole.

Thus, for example, a normal "cool white" phosphor is prepared by firing at about 1150° C., and for a few minutes to an hour or so depending upon batch size, the following mixture of preformed ingredient apatite compositions:

|  | Moles |
|---|---|
| $3Ca_3(PO_4)_2 \cdot 0.9MnF_2$ | 0.1540 |
| $3Ca_3(PO_4)_2 \cdot 0.9(0.67SbF_3)$ | 0.2250 |
| $3Ca_3(PO_4)_2 \cdot 0.9CaCl_2$ | 0.1725 |
| $3Ca_3(PO_4)_2 \cdot 0.9CaF_2$ | 0.4485 |
| Total | 1.0000 |

In this composition, the manganese fluor apatite is proportioned to provide a fixed manganese content for a specific desired color, the antimony fluor apatite is proportioned to provide an optimum antimony content which is used in approximately the same quantity in all the phosphors, the calcium chlor apatite provides a fixed chlorine content for the specific color, and the calcium fluor apatite is proportioned to complete the total molage of one.

Similarly, a normal "warm white" phosphor is prepared by firing the following:

|  | Moles |
|---|---|
| $3Ca_3(PO_4)_2 \cdot 0.9MnF_2$ | 0.3500 |
| $3Ca_3(PO_4)_2 \cdot 0.9(0.67SbF_3)$ | 0.2250 |
| $3Ca_3(PO_4)_2 \cdot 0.9CaCl_2$ | 0.1725 |
| $3Ca_3(PO_4)_2 \cdot 0.9CaF_2$ | 0.2525 |

A normal blue phosphor is prepared by firing:

| | |
|---|---|
| $3Ca_3(PO_4)_2 \cdot 0.9CaF_2$ | 0.7750 |
| $3Ca_3(PO_4)_2 \cdot 0.9(0.67SbF_3)$ | 0.2250 |

An all-chlor phosphor is prepared by firing:

| | |
|---|---|
| $3Ca_3(PO_4)_2 \cdot 0.95MnCl_2$ | 0.1540 |
| $3Ca_3(PO_4)_2 \cdot 0.95(0.67SbCl_3)$ | 0.2250 |
| $3Ca_3(PO_4)_2 \cdot 0.95CaCl_2$ | 0.6210 |

The phosphor designated hereinbefore as HP 1090 C is improved by employing a formulation of the preformed apatites with 0.93 mole of metal halide as follows:

|  | Mol. Wt. | Moles | Parts by Wt. |
|---|---|---|---|
| $3Ca_3(PO_4)_2 \cdot 0.93CaCl_2$ | 1033 | 0.2000 | 206.6 |
| $3Ca_3(PO_4)_2 \cdot 0.93CaF_2$ | 1002.5 | 0.4572 | 458.3 |
| $3Ca_3(PO_4)_2 \cdot 0.93MnF_2$ | 1016.5 | 0.1574 | 160.0 |
| $3Ca_3(PO_4)_2 \cdot 0.93(0.67SbF_3)$ | 1041 | 0.1854 | 193.0 |

The complete phosphor composition may therefore be represented by the formula $3Ca_3(PO_4)_2 \cdot 0.93(CaCl_2, CaF_2, MnF_2, 0.67SbF_3)$.

The proportions of activator are essentially the same as heretofore employed in halophosphate phosphors. For instance, as indicated above, the preferred proportion of antimony fluor apatite is about 22.5 mole percent, although a range of about 10 to 40 mole percent may be used. The manganese fluor apatite may be used in range of zero to about 50 mole percent. On a percent by weight basis of the total composition, this amounts to about .75 to 3 percent Sb, and 0 to 2.4 percent Mn.

The preferred phosphor compositions may thus be described as consisting of 3 moles alkaline earth orthophosphate and $x$ moles "metal" halide wherein: the alkaline earth orthophosphate is $Ca_3(PO_4)_2$, $Ba_3(PO_4)_2$ or $Sr_3(PO_4)_2$ or mixtures thereof; the "metal" includes Ca, Ba or Sr or others and activator metals like Sb, Mn or mixtures thereof; the halogen is preferably F or Cl or mixtures thereof, and may include Br or I at least in part; the metal halide compound includes $CaCl_2$, $CaF_2$, $BaCl_2$, $BaF_2$, $SrCl_2$, $SrF_2$ or other bivalent metals or mixtures thereof, and $MnCl_2$, $MnF_2$, $SbCl_3$, $SbF_3$ or halides of other activators; and "$x$" is not greater than one and preferably is in the range of about 0.8 to 0.95.

While the formulas given herein indicate the molecular proportions and probable combinations of the elements, it must be realized that such substituting elements as manganese or antimony, in the required quantities, may wholly or in part substitute for some of the calcium associated with the tri-calcium phosphate. However, the molar relationships may be expressed as $Ca+Mn+Sb:PO_4$:halogen$=9.8:6.00:1.6$ to $9.95:6.00:1.9$.

What we claim as new and desire to secure by Letters Patent of the United States is:

1. The method of preparing calcium halophosphate phosphor activated by antimony and manganese which comprises preliminary and separately preparing at temperatures in the approximate range of 800–900° C. individual compositions of calcium halo apatite, manganese halo apatite and antimony halo apatite, the halogen in each said composition being from the group consisting of fluorine and chlorine and mixtures thereof, mixing together the said compositions with the manganese and antimony in activating proportions and with the total halide content in an amount of about 0.8 to 0.95 mole per 6 moles of $PO_4$, and firing the mixture at a temperature in the approximate range of 1100–1300° C.

2. The method of preparing an activated halophosphate phosphor which comprises preliminary preparing at a temperature in the approximate range of 800–900° C. a halophosphate of calcium and of apatite composition, separately preparing at a temperature in the approximate range of 800–900° C. a halophosphate of an activator metal of the group consisting of antimony alone and mixtures of antimony with manganese and of apatite composition, mixing the said halophosphate compositions with the activator metal in activating proportions and the total halide content in an amount of about 0.8 to 0.95 mole per 6 moles of $PO_4$, and firing the mixture at a temperature in the approximate range of 1100–1300° C.

3. The method of preparing calcium halophosphate phosphor activated by antimony and manganese which comprises preliminary and separately preparing at temperatures in the approximate range of 800–900° C. individual compositions of calcium chlor apatite, calcium fluor apatite, manganese fluor apatite and antimony fluor apatite, mixing together the said compositions with the manganese and antimony in activating proportions and with the total halide content in an amount of about 0.8 to 0.95 mole per 6 moles of $PO_4$, and firing the mixture at a temperature in the approximate range of 1100–1300° C.

References Cited in the file of this patent

UNITED STATES PATENTS

| | | |
|---|---|---|
| 2,476,654 | Froelich | July 19, 1949 |
| 2,488,733 | McKeag | Nov. 22, 1949 |
| 2,579,900 | Butler | Dec. 25, 1951 |
| 2,726,214 | Ranby | Dec. 6, 1955 |
| 2,755,254 | Butler | July 17, 1956 |
| 2,772,241 | Ranby | Nov. 27, 1956 |

OTHER REFERENCES

Jerome: J. Electrochem. Soc., September 1950, vol. 97, No. 9, pp. 265–270.